A. W. MESICK.
TAPPING AND DRILLING MACHINE.
APPLICATION FILED APR. 30, 1918.
1,291,592.
Patented Jan. 14, 1919.
2 SHEETS—SHEET 1.
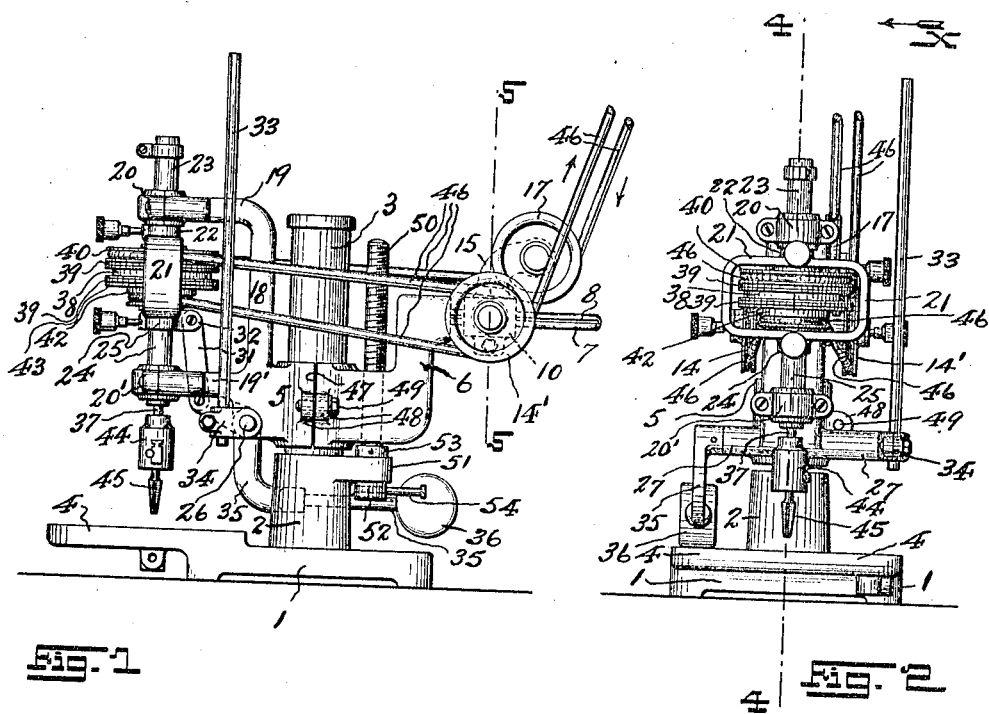
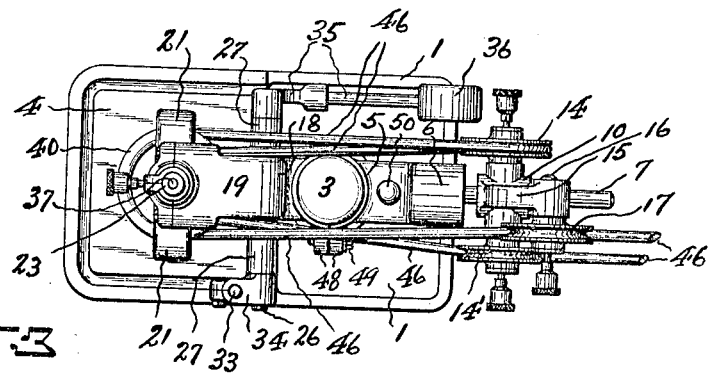
WITNESSES:
INVENTOR
Albert W. Mesick,
BY
Frautzel & Richards
ATTORNEYS

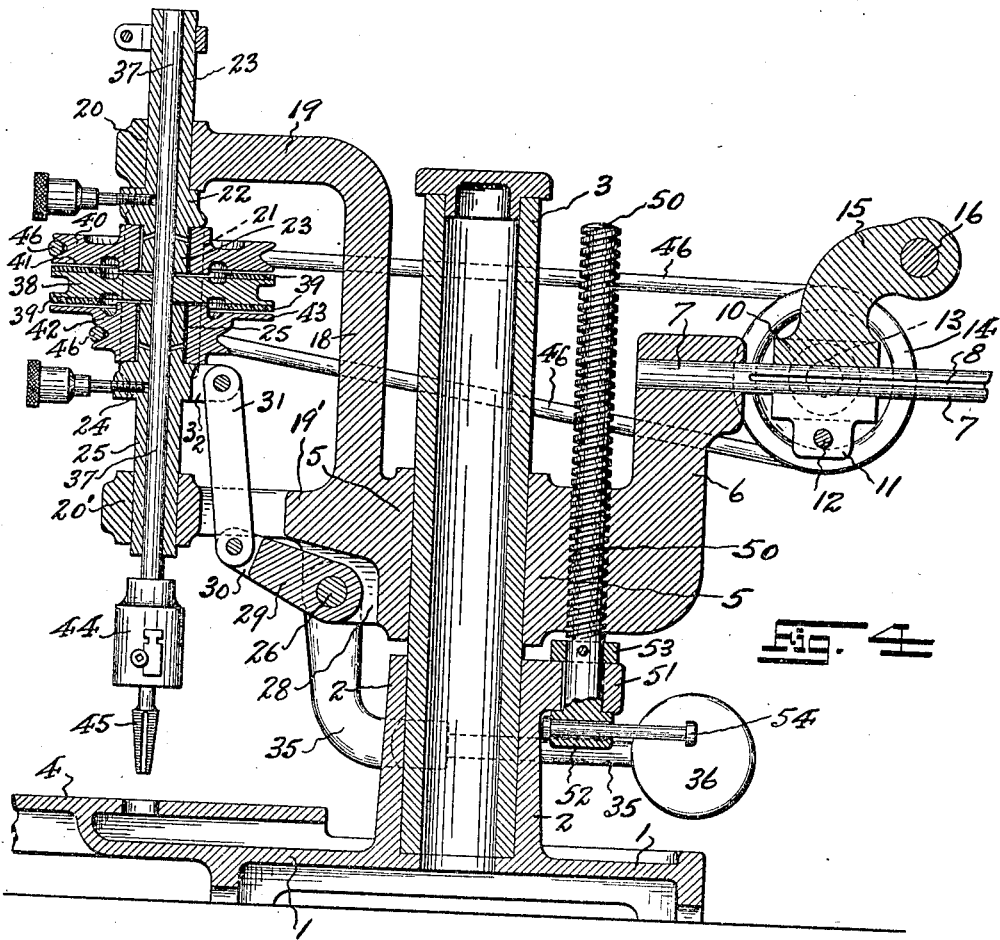

UNITED STATES PATENT OFFICE.

ALBERT W. MESICK, OF BROOKLYN, NEW YORK.

TAPPING AND DRILLING MACHINE.

1,291,592.  Specification of Letters Patent.  Patented Jan. 14, 1919.

Application filed April 30, 1918. Serial No. 231,699.

*To all whom it may concern:*

Be it known that I, ALBERT W. MESICK, a citizen of the United States, residing at Brooklyn, in the county of Kings and State of New York, have invented certain new and useful Improvements in Tapping and Drilling Machines; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally, to improvements in sensitive tapping and drilling machines; and the invention has reference, more particularly, to a reversible belt driven sensitive tapping and drilling machine, having novel means for adjusting the working parts relative to a fixed work table, and having a novel movable means for carrying the tool chuck spindle and the two speed sensitive transmission mechanism for operating the said spindle.

The invention has for its principal object to provide a simple, compact and easily operated reversible belt driven sensitive tapping and drilling machine, which is provided with a novel means for mounting the chuck spindle transmission mechanism, so that the chuck spindle and the reversible transmission means are supported in a novel vertically movable yoke or head, of such construction that all necessity for splining the chuck spindle is avoided, and a novel reversible belt driven friction transmission, capable of operating at a proper working speed in one direction, and at a high speed in an opposite direction, may be utilized with the maximum degree of sensitiveness, and whereby the tool may be operatively fed to and removed from the work speedily, and with no back-lash or loose play in the operating mechanism.

Another object of the present invention is to provide a novel means for supporting the working parts of the machine so that desired vertical adjustments of the same relative to a fixed work table may readily be made.

And still another object of the present invention is to provide a novel means for adjusting a driving belt to accommodate the same to various adjusted conditions of the working parts of the machine.

Other objects of the present invention, not at this time more particularly enumerated, will be clearly understood from the following detailed description of the same.

With the various objects of the present invention in view, the same consists, primarily, in the novel sensitive tapping and drilling machine, hereinafter set forth; and, the invention consists, furthermore, in the various arrangements and combinations of the several devices and parts, as well as in the details of the construction of the same, all of which will be more fully described in the following specification, and then finally embodied in the claims which are appended thereto.

The invention is clearly illustrated in the accompanying drawings, in which:—

Figure 1 is a side elevation, Fig. 2 is a front elevation, and Fig. 3 is a plan or top view of the complete novel tapping and drilling machine, made according to and embodying the principles of my present invention.

Fig. 4 is a vertical longitudinal section through the same, taken on line 4—4 in said Fig. 2, looking in the direction of the arrow *x*, said view being drawn on an enlarged scale.

Fig. 5 is a transverse section taken on line 5—5 in said Fig. 1, looking toward the right, said view being also drawn on an enlarged scale.

Similar characters of reference are employed in all of the hereinafter described views to indicate corresponding parts.

Referring now to said drawings, the reference character 1 indicates a suitable base having a socket portion 2 from which rises the vertical standard or column 3 upon which the mechanism is mounted, when the machine is built in the vertical style, but, which base and standard or column may be suitably modified when the machine is built in the horizontal style. Connected with the forward end of said base 1, preferably as an integral part thereof, is a work supporting table. Slidably mounted on said standard or column 3 is a carrier frame 5, having at one side an upwardly extending arm 6, in the upper end of which is secured an outwardly and rearwardly extending bracket arm 7, having formed in its surface one or more spline-ways 8. Slidably mounted upon said bracket arm 7, but prevented from turning thereon by means of the splines 9 which ride in said spline-ways 8, is a split block 10 having perforate ears 11 to receive a lock bolt device 12, whereby said split block 10 may be tightened or clamped upon said bracket arm 7, in desired adjusted position. Connected with said split block 10 are a pair of oppositely and laterally projecting journal studs 13 and 13′, upon each of which is rotatably mounted the respective grooved pulleys 14 and 14′. Extending upwardly and rearwardly from said split block 10 is a bracket member 15, provided with a laterally projecting journal stud 16 upon which is rotatably mounted a grooved pulley 17. Connected with the opposite side of said carrier frame 5 is an upwardly extending arm 18 provided with a pair of vertically spaced outwardly and forwardly extending bracket-arms 19 and 19′ having respectively at their free ends suitable guide bearings 20 and 20′.

The reference character 21 indicates a suitable head-frame or yoke-member, preferably of the rectangular form shown. Integrally connected with the upper portion of said head-frame or yoke-member 21 is the upper hub portion 22, which terminates in the upwardly extending bearing sleeve 23 adapted to be slidably movable through the guide bearing 20, and integrally connected with the lower portion of said head-frame or yoke-member 21 is the lower hub portion 24, which terminates in the downwardly extending bearing sleeve 25 adapted to be slidably movable through the guide bearing 20′. The means for imparting vertical movements to said head-frame or yoke-member 21 comprises a rocking shaft 26 which is mounted in laterally and oppositely projecting bearing portions 27 connected with said carrier frame 5. Said carrier frame 5 is cutaway as at 28, intermediate of said bearing portions 27 to permit the connection with said rocking shaft 26, in proper location, of a rocking arm 29, pivotally connected with the bifurcated end 30 of which is a link 31. The lower portion of said head-frame or yoke-member 21 is provided with perforate ears 32, to which the opposite or upper end of said link 31 is pivotally connected, to operatively interconnect said head-frame or yoke-member with said rocking-arm. Connected with one end of said rocking shaft 26 is a hand lever 33, any suitable attaching means, such as the clamp arm 34, being employed to secure said hand-lever operatively to said rocking-shaft. Connected with the opposite end of said rocking shaft 26 is a lever arm 35, upon the free end of which is secured a suitable counter-balance weight 36, whereby the weight of said head-frame or yoke-member and its associated parts are counterbalanced in connection with the rocking-shaft and interconnecting parts.

Journaled in said respective upwardly and downwardly extending bearing sleeves 23 and 25 of said head-frame or yoke-member, so as to extend vertically therethrough, is a spindle 37. Fixed on said spindle 37 so as to rotate therewith, and so as to be located within the embrace of said head-frame or yoke-member, is a friction disk clutch 38, provided on opposite sides, around the marginal area thereof, with friction gripping members 39, preferably constructed of leather, composition, rubber or other suitable material.

Rotatably mounted on the lower end of said bearing sleeve 23, which projects downwardly within the inclosure of said head-frame or yoke-member 21, is a slow speed grooved pulley 40, which is thus located within said head-frame or yoke-member and above said friction disk clutch 38. The under side of said pulley 40 is provided with an annular marginal portion or friction surface 41 which is opposed to and operatively receives the engagement of the upper friction gripping member 39 of said friction disk clutch 38.

Rotatably mounted on the upper end of said bearing sleeve 25, which projects upwardly within the inclosure of said head-frame or yoke-member 21, is a high speed grooved pulley 42, which is thus located within said head-frame or yoke-member and beneath said friction disk clutch 38. The upper side of said high speed pulley is provided with an annular flange 43 the upper surface of which provides a friction surface which is opposed to and operatively receives the engagement of the lower friction gripping member 39 of said friction disk clutch.

Secured upon the lower end of said spindle 37 is any desirable form or construction of chuck 44, adapted to operatively couple with the spindle a tap 45, or a drill (not shown), according to the desired use to which the machine is to be put.

The reference character 46 indicates a suitable endless belt which travels from any suitable source of power over said grooved pulley 17 (in the direction of the arrow in Fig. 1), thence around said slow speed grooved pulley 40 back to and over the idler pulley 14, thence forwardly and around the high speed grooved pulley 42, and thence back around the idler pulley 14′ back to the source of power. This arrangement of the driving belt assures the driving of the slow speed pulley in one and a proper working direction and the high speed pulley in a reverse direction.

In order to permit the operating mechanism of the machine to be raised and lowered upon the standard or column 3, to adjust the same to proper working position relative to the height of the work supported upon the table 4, the carrier frame 5 is split vertically, as at 47, in that part thereof which embraces said standard or column 3, perforate ears 48 projecting from said part to receive a clamp bolt device 49 for tightening or clamping the carrier frame in desired adjusted position on said standard or column 3. In order to raise or lower the carrier frame and mechanism associated therewith, I provide a vertical jack-screw 50, the lower end of which is rotatably journaled in a bracing lug 51 connected with and projecting from the side of said socket portion 2 of the base 1. The head 52 of said jack-screw 50 engages the under side of said bearing lug 51, and prevents vertical displacement of the same in an upward direction, while a collar 53, pinned or otherwise secured to the body of the jack-screw, engages the upper side of said bearing lug 51, and prevents vertical displacement of the same in a downward direction. The said jack-screw is operatively engaged in a threaded vertical opening formed in said carrier frame 5, so that by loosening the carrier frame 5 from a normal clamped relation to said standard or column 3, and then rotating the jack-screw in proper direction, the carrier-frame 5 and its associated parts may be moved vertically up or down upon said standard or column.

As an aid in turning said jack-screw, for the above described adjusting operation, I provide the head 52 thereof with a hand lever 54, which may be slid transversely through the same, and which provides sufficient leverage to easily impart the desired rotary movement to the jack-screw, as will be clearly understood.

Since the split block 10 may be adjusted back and forth on the bracket-arm 7, it will be apparent that any undue slackening of the belt 46, by reason of adjustment of the carrier-frame 5 or other causes, may readily be corrected and the belt properly tightened by moving the block 10 and thereby shifting the pulleys 14, 14' and 17 to proper positions for the operative support of the running belt.

In operating the machine, the work is placed upon the work supporting table 4, and the carrier-frame 5 is adjusted to the desired position upon the standard or column 3. The power being turned on, the belt 46 rotates the grooved pulleys 40 and 42. The hand lever 33 is now utilized to rock the rocking shaft 26, which imparts a downward swinging movement to said rocking arm 29, such movement being transmitted through the link 31 to the head-frame or yoke-member 21, so that the latter is caused to move downwardly, being guided in such downward movement by the sliding engagement of its bearing sleeves 23 and 25 with the guide bearings 20 and 20' of the carrier frame structure. This downward movement of the head-frame or yoke-member 21 carries with the latter the spindle 37 and the associated power transmission parts. This lowering movement brings the tap 45 in engagement with the work. As soon as the tap contacts with the work, an upward pressure is exerted upon the spindle 37 tending to move the same slightly in its bearing provided by the sleeves 23 and 25, thereby forcing the friction disk clutch 38 upwardly, so that the upper friction gripping member thereof is carried into frictional clutching engagement with the friction surface 41 of the rotating slow speed pulley 40, consequently an immediate rotary movement is imparted to said spindle 37 and the tap 45, thus driving the tap in the working direction, into the work. The tapping operation being completed, the lever arm 33 is swung in the opposite direction to impart a rising movement to said head-frame or yoke-member 21, which carries upward the associated transmission parts, causing the tap 45 to drag in the work. Such drag causes the spindle to lag so that the upward movement of the head-frame or yoke-member carries away the slow-speed pulley 40 from operative engagement with the friction clutch disk, and carries into engagement with the lower friction gripping member 39 of said friction clutch disk 38 the friction surface of the annular flange 43 of the high speed pulley 42, so that the latter imparts thereupon a high speed to the spindle 37 in a reverse direction, whereby the tap is reversed or rotated in a withdrawing direction to remove the same quickly from the work. Since the transmission mechanism and the driving spindle is carried in the vertically movable head-frame or yoke-member, which so embraces the same as to cause immediate movement of said transmission mechanism, it will be apparent that all necessity of splines in connection with the transmission mechanism is avoided, and consequently the said mechanism may be made very sensitive, and free from back lash and other similar mechanical weaknesses, and at the same time a two speed belt drive may be used in a more positive and satisfactory manner than has been heretofore possible.

I am aware that some changes may be made in the general arrangements and combinations of the devices and parts, as well as in the details of the construction of the same, without departing from the scope of my present invention as described in the foregoing specification, and as defined in the appended claims. Hence, I do not limit my invention to the exact arrangements and combinations of the various devices and parts as set forth in the foregoing specification, nor do I confine myself to the exact details of the construction of said parts as illustrated in the accompanying drawings.

I claim:—

1. In a device of the kind described, the combination with a supporting frame of a vertically movable yoke-member having bearing sleeves slidably related to said supporting frame, a chuck spindle journaled in said bearing sleeves, a friction clutch disk fixed on said spindle, a slow speed pulley rotatably mounted and carried by said yoke-member above and in operative relation to said friction clutch disk, a high speed pulley rotatably mounted and carried by said yoke-member beneath and in operative relation to said friction clutch disk, a belt transmission means for driving said respective pulleys in opposite directions, and manually controllable means connected with said supporting frame for imparting vertical movements to said yoke-member and said transmission carried thereby.

2. In a device of the kind described, the combination with a supporting frame of a vertically movable yoke-member having bearing sleeves slidably related to said supporting frame, a chuck spindle journaled in said bearing sleeves, a friction clutch disk fixed on said spindle, a slow speed pulley rotatably mounted and carried by said yoke-member above and in operative relation to said friction clutch disk, a high speed pulley rotatably mounted and carried by said yoke-member beneath and in operative relation to said friction clutch disk, a belt transmission means for driving said respective pulleys in opposite directions, and manually controllable means connected with said supporting frame for imparting vertical movements to said yoke-member and said transmission carried thereby, comprising a rocking shaft journaled in connection with said supporting frame, a rocking-arm connected with said shaft, a link interconnecting said yoke-member with said rocking-arm, and a hand lever connected with said rocking shaft.

3. In a device of the kind described, a base having a stationary work supporting table connected therewith, a vertical column connected with said base in the rear of said work supporting table, a carrier frame vertically movable on said column, means for adjusting said carrier frame on said column, means for locking said carrier frame in adjusted position, a pair of forwardly projecting vertically spaced bracket arms having guide bearings connected with said carrier frame, a yoke-member having upwardly and downwardly vertically extending bearing sleeves slidably related respectively to said guide bearings, a chuck spindle journaled in said bearing sleeves so as to extend through said yoke-member, a slow speed pulley rotatably mounted upon said upwardly extending bearing sleeve within said yoke-member, a high speed pulley rotatably mounted upon said downwardly extending bearing sleeve within said yoke-member, a friction clutch disk fixed on said spindle between said pulleys so as to be operatively engaged with one or the other thereof, a belt transmission means adjustably related to said carrier frame to support a belt engaged over said pulleys to drive the latter in opposite directions, and manually controllable means connected with said carrier frame for imparting vertical movements to said yoke-member and the mechanism associated therewith.

4. In a device of the kind described, a base having a stationary work supporting table connected therewith, a vertical column connected with said base in the rear of said work supporting table, a carrier frame vertically movable on said column, means for adjusting said carrier frame on said column, means for locking said carrier frame in adjusted position, a pair of forwardly projecting vertically spaced bracket arms having guide bearings connected with said carrier frame, a yoke-member having upwardly and downwardly vertically extending bearing sleeves slidably related respectively to said guide bearings, a chuck spindle journaled in said bearing sleeves so as to extend through said yoke-member, a slow speed pulley rotatably mounted upon said upwardly extending bearing sleeve within said yoke-member, a high speed pulley rotatably mounted upon said downwardly extending bearing sleeve within said yoke-member, a friction clutch disk fixed on said spindle between said pulleys so as to be operatively engaged with one or the other thereof, a belt transmission means adjustably related to said carrier frame to support a belt engaged over said pulleys to drive the latter in opposite directions, and normally controllable means connected with said carrier frame for imparting vertical movements to said yoke-member and the mechanism associated therewith, comprising a rocking shaft journaled in connection with said supporting frame, a rocking-arm connected with said shaft, a link interconnecting said yoke-member with said rocking-arm, and a hand lever connected with said rocking shaft.

5. In a device of the kind described, a supporting means having a work table, a carrier frame adjustably related to said supporting means, a vertically movable yoke-member having upwardly and downwardly extending bearing sleeves, guide means on said carrier frame in which said sleeves are engaged, a chuck spindle journaled in said sleeves so as to extend through said yoke-member, a slow speed pulley journaled rotatably within said yoke-member, a high speed pulley journaled rotatably within said yoke-member, a friction clutch disk fixed on said spindle between said pulleys so as to be operatively engaged with one or the other thereof, a belt transmission means for driving said pulleys in opposite directions, and a manually controllable means connected with said carrier frame for imparting vertical movements to said yoke-members and the mechanism therewith.

6. In a device of the kind described, a supporting means having a work table, a carrier frame adjustably related to said supporting means, a vertically movable yoke-member having upwardly and downwardly extending bearing sleeves, guide means on said carrier frame in which said sleeves are engaged, a chuck spindle journaled in said sleeves so as to extend through said yoke-member, a slow speed pulley journaled rotatably within said yoke-member, a high speed pulley journaled rotatably within said yoke-member, a friction clutch disk fixed on said spindle between said pulleys so as to be operatively engaged with one or the other thereof, a belt transmission means for driving said pulleys in opposite directions, and a manually controllable means connected with said carrier frame for imparting vertical movements to said yoke-member and the mechanism associated therewith, comprising a rocking shaft journaled in connection with said carrier frame, a rocking arm connected with said shaft, a link interconnecting said yoke-member with said rocking arm, a hand lever connected with said shaft, and a lever-arm having a counter-balance weight also connected with said shaft.

7. In a device of the kind described, a carrier frame, a yoke-member supported by said carrier frame so as to be capable of vertical movement relative thereto, a vertical chuck-spindle rotatably mounted in connection with said yoke-member, a friction clutch disk fixed on said spindle within the embrace of said yoke-member, a slow speed pulley, a high speed pulley, means for rotatably mounting said pulleys upon said yoke-member respectively above and below said friction clutch disk so as to be engageable by the latter, a belt transmission means for driving said pulleys in opposite directions, and means connected with said carrier frame for imparting vertical movements to said yoke-member.

8. In a device of the kind described, a carrier frame, a yoke-member supported by said carrier frame so as to be capable of vertical movement relative thereto, a vertical chuck-spindle rotatably mounted in connection with said yoke-member, a friction clutch disk fixed on said spindle within the embrace of said yoke-member, a slow speed pulley, a high speed pulley, means for rotatably mounting said pulleys upon said yoke-member respectively above and below said friction clutch disk so as to be engageable by the latter, a belt transmission means for driving said pulleys in opposite directions, a rocking-shaft mounted on said carrier frame, a rocking arm on said shaft, a link interconnecting said rocking-arm with said yoke-member, and means for rocking said shaft.

9. In a device of the kind described, a carrier frame, a yoke-member supported by said carrier frame so as to be capable of vertical movement relative thereto, a vertical chuck-spindle rotatably mounted in connection with said yoke-member, a friction clutch disk fixed on said spindle within the embrace of said yoke member, a slow speed pulley, a high speed pulley, means for rotatably mounting said pulleys upon said yoke-member respectively above and below said friction clutch disk so as to be engageable by the latter, a belt transmission means for driving said pulleys in opposite directions, a rocking-shaft mounted on said carrier frame, a rocking arm on said shaft, a link interconnecting said rocking-arm with said yoke-member, a hand lever connected with said shaft for rocking the same, and a lever arm connected with said shaft having a counter-balance weight secured thereon.

In testimony, that I claim the invention set forth above I have hereunto set my hand this 19th day of April, 1918.

ALBERT W. MESICK.

Witnesses:
GEORGE D. RICHARDS,
MARION M. BANTA.

Copies of this patent may be obtained for five cents each, by addressing the "Commissioner of Patents, Washington, D. C."